United States Patent
Dorn

(10) Patent No.: US 7,213,971 B2
(45) Date of Patent: May 8, 2007

(54) LINEAR ROLLER BEARING WITH ROLLER BODY ORIENTATION

(75) Inventor: Stefan Dorn, Arnstein (DE)

(73) Assignee: Rexroth Star GmbH, Schweinfurt (DE)

( * ) Notice: Subject to any disclaimer, the term of this patent is extended or adjusted under 35 U.S.C. 154(b) by 9 days.

(21) Appl. No.: 11/135,188

(22) Filed: May 23, 2005

(65) Prior Publication Data

US 2005/0265637 A1    Dec. 1, 2005

(30) Foreign Application Priority Data

May 29, 2004    (DE)    ............... 10 2004 026 369

(51) Int. Cl.
*F16C 29/06*    (2006.01)
(52) U.S. Cl. ......................................................... 384/45
(58) Field of Classification Search ............ 384/43–45
See application file for complete search history.

(56) References Cited

U.S. PATENT DOCUMENTS

| | | | | |
|---|---|---|---|---|
| 3,200,770 A | * | 8/1965 | Hendry | ............. 105/163.1 |
| 3,511,545 A | * | 5/1970 | Brettrager | ................ 384/45 |
| 4,561,703 A | * | 12/1985 | Dabringhaus | ............ 384/44 |
| 5,809,855 A | * | 9/1998 | Francia | ..................... 384/45 |
| 6,203,199 B1 | | 3/2001 | Pfeuffer | |

* cited by examiner

*Primary Examiner*—Thomas R. Hannon
(74) *Attorney, Agent, or Firm*—Michael J. Striker

(57) ABSTRACT

A linear roller bearing has a guide rail extending in a longitudinal direction; a guide carriage which is guided longitudinally displaceably on the guide rail; at least two revolving rows of roller bodies, by means of which the guide carriage is guided on the guide rail, a plurality of endless revolution conduits each formed by a load-bearing conduit and a return conduit that extends in the guide carriage, each of the rows of roller bodies being received in the endless revolution conduit; a track provided on the guide rail and a track provided on the guide carriage, which tracks define the load-bearing conduit; and a portion provided on an inner circumferential surface of each return conduit and being movable relative to the track of the guide carriage.

13 Claims, 4 Drawing Sheets

LINEAR ROLLER BEARING WITH ROLLER BODY ORIENTATION

CROSS-REFERENCE

The invention described and claimed hereinbelow is also described in DE 10 2004 026 369.8, filed on May 29, 2004. This German Patent Application, whose subject matter is incorporated here by reference, provides the basis for a claim of priority of invention under 35 U.S.C. 119 (a)–(d).

BACKGROUND OF THE INVENTION

The present invention relates to a linear roller bearing with a roller body orientation.

More particularly, the invention relates to a linear roller bearing, having a guide rail extending in the longitudinal direction and having a guide carriage, which is guided longitudinally displaceably on the guide rail by means of at least two revolving rows of roller bodies, in which one row of roller bodies each is received in an endless revolution conduit, which is formed by a load-bearing conduit and a return conduit that extends in the guide carriage, and in which the load-bearing conduit is defined by a track on the guide rail and a track on the guide carriage.

Such linear roller bearings are known, for instance from U.S. Pat. No. 6,203,199 B1. These linear roller bearings have the disadvantage that as the roller bodies roll along, noises are produced, because the roller bodies in the return conduit hit one another, especially where they are forced along a tight curved path. Moreover, the individual roller bodies of the various rows of roller bodies do not enter the load-bearing conduit simultaneously. When the roller bodies travel under load or with prestressing in the load-bearing conduit, this causes an asymmetrical distribution of force in the guide carriage.

Because of its unavoidable elasticity, the guide carriage makes extremely small tilting motions. These deviations from the ideal linear motion are a problem when the linear roller bearing is to be used in high-precision machine tools, such as power grinders. Moreover, the problem of fluctuating frictional forces in the direction of motion arises, which is again caused by the nonsimultaneous entry of the roller bodies into the load-bearing zones.

SUMMARY OF THE INVENTION

It is the object of the invention to create a linear roller bearing of the type which produces less noise and has higher precision of motion.

According to the invention, this object is attained by a linear roller bearing of the above-mentioned type, in which one portion which is embodied as movable relative to the track on the guide carriage is provided on the inner circumferential face of each return conduit.

The motions of the portions of the inner circumferential faces of the return conduits are transmitted to all the roller bodies traveling past them, so that all the roller bodies move at the same speed and no longer hit one another. The motions of the portions of the inner circumferential faces of the return conduits can be coupled, so that the roller bodies of all the rows of roller bodies enter the associated load-bearing conduits at defined time intervals relative to one another, which improves the precision of motion of the linear roller bearing.

In a preferred embodiment, it is possible for each return conduit to include at least one curved conduit and one longitudinal conduit, and the inner circumferential face of the at least one curved conduit is formed by a radially inner curved face and a radially outer curved face, and a portion of the radially inner curved face is embodied as movable relative to the track on the guide carriage. In the curved conduits, the balls strike one another especially forcefully and produce noise, since they are forced along a tight curved path. The effect of the invention is therefore especially great there. The curved conduits are furthermore regularly disposed directly at the load-bearing conduits, which assures that the roller bodies enter the load-bearing conduits in the intended relationship to one another.

Moreover, the moving portion of the radially inner curved face can be formed by a deflection wheel, which is supported rotatably in the guide carriage. In this way, the linear roller bearing of the invention can be implemented especially inexpensively. Retention means for the roller bodies may be provided on the moving portion of the radially inner curved face, so that the roller bodies are reliably kept in the intended relationship to one another. The retention means can keep the roller bodies spaced apart from one another. Moreover, the retention means can keep the roller bodies transversely to the center line of the load-bearing conduit, specifically and preferably in such a way that the path of the roller bodies in the transitional region between the curved conduit and the load-bearing conduit extends without discontinuities or kinks, thereby again reducing noise.

It is also proposed that one roller body from each row of revolving roller bodies enters the load-bearing conduit at the same time. It has in fact been demonstrated that under these conditions, the precision of motion of the linear roller bearing is especially high, since the distribution of force in the guide carriage is especially symmetrically. This condition can be assured especially inexpensively by providing that the rotary motions of the aforementioned deflection wheels are coupled by means of a traction gear mechanism and/or a gearwheel mechanism. However, it is also conceivable that the deflection wheels are driven by means of electric motors, and the rotary motion of the electric motors is electronically coupled.

Moreover, the roller bodies in the at least two revolving rows of roller bodies can be kept spaced apart from one another by means of a roller body chain or by means of a plurality of spacer pieces. Thus the motion of the portion of the inner circumferential face of the return conduit is transmitted to all the roller bodies in the row of roller bodies, and not only to the roller bodies in the sphere of influence of the aforementioned portion.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
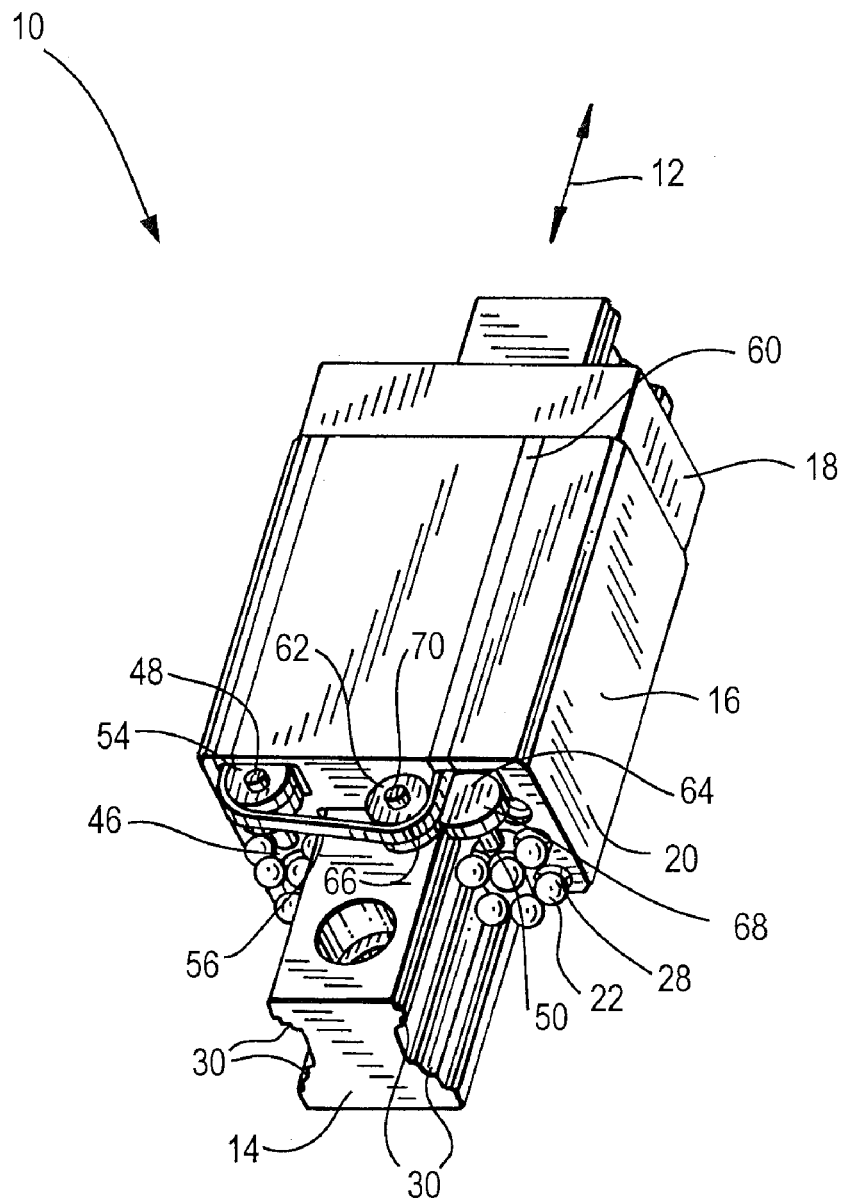
FIG. 1 is a perspective view of a linear roller bearing of the invention, with the end cap removed.
Figure 2:
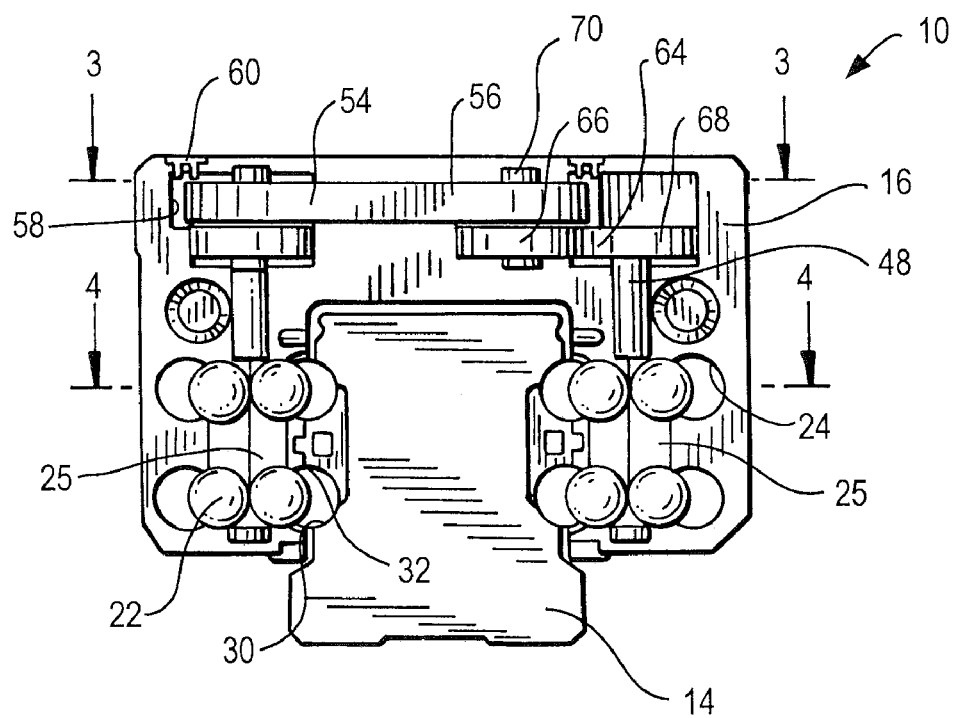
FIG. 2 is a front elevation view of the linear roller bearing of FIG. 1.
Figure 3:
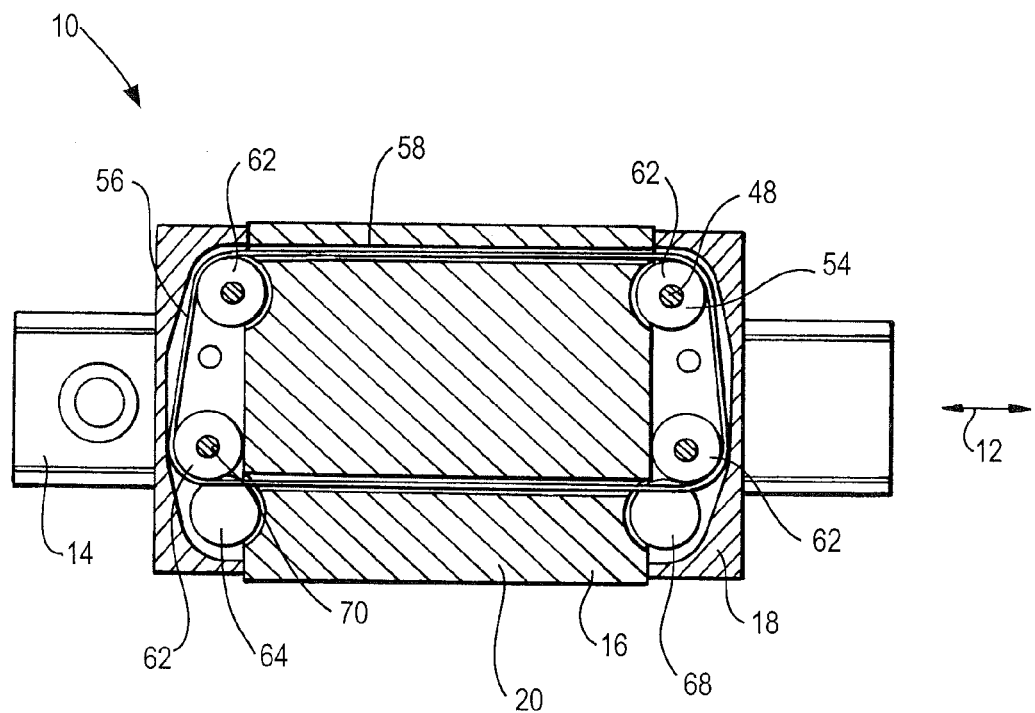
FIG. 3 is a sectional view of the linear roller bearing of FIG. 1, taken along the line A—A in FIG. 2.
Figure 4:
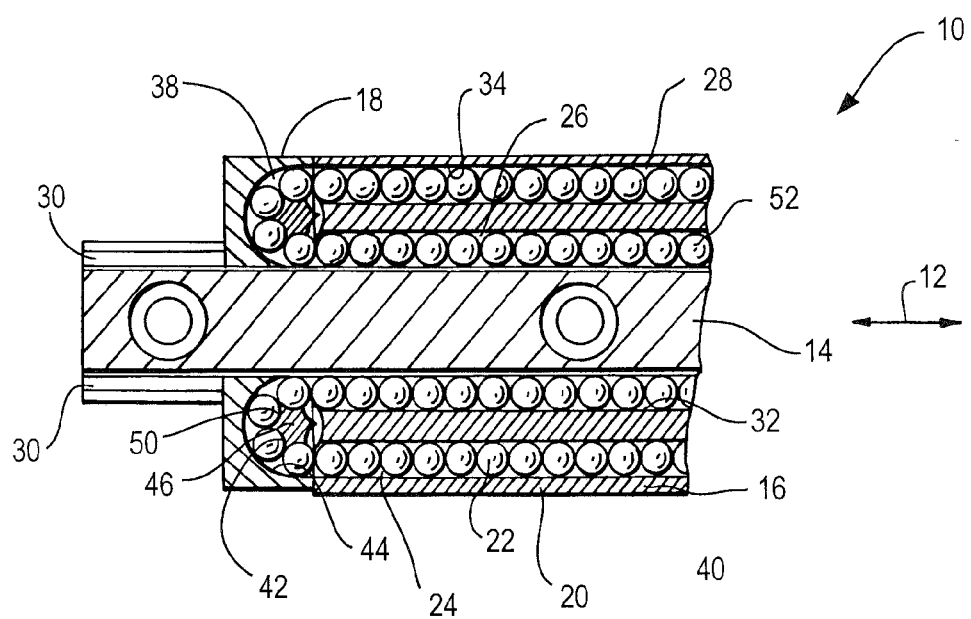
FIG. 4 is a further sectional view of the linear roller bearing of FIG. 1, taken along the line B—B in FIG. 2.

In FIG. 1, a linear roller bearing of the invention is identified very generally by reference numeral 10. The linear roller bearing comprises a guide rail 14, which extends in the longitudinal direction 12. On the guide rail, a guide carriage 16 is guided to be movable in the longitudinal direction. The guide carriage is braced on the guide rail 14 by way of four rows of roller bodies 22. The roller bodies are embodied as balls, which revolve in four endless revolution conduits 24. An endless revolution conduit 24 comprises one load-bearing conduit 26 and one return conduit 28.

In the load-bearing conduit, the roller bodies 22 each touch one track 30 on the guide rail 14 and one track 32 on the guide carriage 16, so that external forces can be transmitted from the guide carriage to the guide rail. In the return conduit 28, the roller bodies move without a load from one end of the load-bearing conduit 26 back to the other end of the load-bearing conduit. The return conduit comprises two curved conduits 38 and one longitudinal conduit 40. The longitudinal conduit 40 extends in the main body 20 of the guide carriage, which like the guide rail 14 is made of steel and is hardened in the region of the tracks 30, 32. On the front and rear ends of the main body 20 of the guide carriage, there is one end cap 18 each of injection-molded plastic, in which the curved conduits 38 are located.

The curved conduits 38 have a radially inner curved face 42 and a radially outer curved face 44. The radially outer curved face 44 is fixed in the end cap 18 and forces the roller bodies 22 along a curved path counter to centrifugal force. The radially inner curved face 42 is embodied in the form of a deflection wheel 46, with a shaft 48 that is rotatably supported in the end cap 18. On the deflection wheel 46, retention means 50 are provided, which are embodied in the form of recesses adapted to the roller bodies. The roller bodies are held in the recesses with little play in a direction transverse to the center line 52 of the load-bearing conduit.

The deflection wheel 46 and the radially outer curved face 44 are dimensioned such that the roller bodies 22 in the curved conduit 38 cannot get from one recess into the next. Hence the roller bodies 22 are necessarily guided by the deflection wheel 46. The deflection wheel is designed and located such that the roller bodies travel along a path that is free of discontinuities and kinks, directly into the load-bearing conduit; between the roller bodies, a slight spacing, which is not shown, is provided.

The endless revolution conduits 24 are combined into two groups 25, which are located on diametrically opposite sides of the guide rail 14. Each curved conduit 38 is assigned one deflection wheel 46, and two deflection wheels, each assigned to different revolution conduits, are each seated on one common shaft 48. The two deflection wheels are oriented on the shaft relative to one another in such a way that two roller bodies each enter the load-bearing conduit simultaneously. The rotary motion of the shafts 48 of the deflection wheels is coupled, by means of one traction gear mechanism 54 and two gear wheel mechanisms 64, in such a way that four roller bodies at a time from the two groups 25 enter the associated load-bearing conduits 26 simultaneously.

The traction gear mechanism 54 is embodied as a toothed belt gear mechanism, with one toothed belt 56 and four toothed belt wheels 62, of which two are seated on each shaft 48 of the deflection wheels. The two other toothed belt wheels 62 are located, together with a first gear wheel 66, on one intermediate shaft 70 each, which is supported rotatably in the end cap 18. The first gear wheel meshes with a second gear wheel 68, which is seated on the shaft 48 of the deflection wheels 46, so that this shaft has the opposite direction of rotation from the intermediate shaft 70. The toothed belt 56 passes through two grooves 58 in the main body 20 of the guide carriage, which are covered by a cover strip 60. The cover strip is connected by means of a snap connection to the main body 20 of the guide carriage in such a way that no dirt can get into the drive train; the cover strip 60 does not protrude out of the main body 20 of the guide carriage.

The driving energy for driving the revolution of the roller bodies and for driving the deflection wheels 46 is brought to bear by the external forces, which act on the linear roller bearing 10 in order to displace it in the longitudinal direction 12. The linear motion of the linear roller bearing causes the roller bodies 22 in the load-bearing conduit 26 to be set into a rolling motion, because of frictional forces. Since the endless revolution conduit 24 is nearly completely filled with roller bodies 22, this motion is transmitted to the roller bodies in the return conduit 28, which in turn are drivingly connected to the deflection wheels 46.

In closing, it should be pointed out that the longitudinal direction 12 of the guide rail 14 should be understood in the context of the present invention as a local parameter. This means that the guide rail need not run in a straight line over its entire length but instead can certainly include curved portions. In these curved portions, the longitudinal direction of the guide rail then extends parallel to a tangent to the actual course of the guide rail in these curved portions.

It will be understood that each of the elements described above, or two or more together, may also find a useful application in other types of constructions differing from the types described above.

While the invention has been illustrated and described as embodied in linear roller bearing with roller body orientation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A linear roller bearing, comprising a guide rail extending in a longitudinal direction; a guide carriage which is guided longitudinally displaceably on said guide rail; at least two revolving rows of roller bodies, by means of which said guide carriage is guided on said guide rail; a plurality of endless revolution conduits each formed by a load-bearing conduit and a return conduit that extends in said guide carriage, each of said rows of roller bodies being received in said endless revolution conduit; a track provided on said guide rail and a track provided on said guide carriage, which tracks define said load-bearing conduit; and a portion provided on an inner circumferential surface of each return conduit and being movable relative to said track of said guide carriage, wherein said portions provided on said inner circumferential face of said return conduits are formed so that motions of said portions are coupled.

2. A linear roller bearing as defined in claim 1, wherein each of said return conduits includes at least one curved conduit and one longitudinal conduit, said inner circumferential face of said at least one curved conduit being formed by a radially inner curved face and a radially outer curved face and a portion of said radially inner curved face being formed movable relative to said track on said guide carriage.

3. A linear roller bearing as defined in claim 2, wherein said movable portion of said radially inner curved face is formed by a deflection wheel which is supported rotatably in said guide carriage.

4. A linear roller bearing as defined in claim 3; and further comprising retention means for said roller bodies, provided on said movable portion of said radially inner curved face.

5. A linear roller bearing as defined in claim 3; and further comprising a traction gear mechanism which couples rotary motions of said deflection wheels.

6. A linear roller bearing as defined in claim 3; and further comprising a gear wheel mechanism which couples rotary motions of said deflection wheels.

7. A linear roller bearing as defined in claim 3; and further comprising electric motors which drive said deflection wheels and have a rotary motion, said rotary motions of said electric motors being electronically coupled.

8. A linear roller bearing as defined in claim 2; and further comprising retention means for said roller bodies, provided on said movable portion of said radially inner curved face.

9. A linear roller bearing as defined in claim 8, wherein said retention means are formed so as to keep said roller bodies spaced from one another.

10. A linear roller bearing as defined in claim 8, wherein said retention means are formed so as to keep said roller bodies transversely to a center line of said load-bearing conduit.

11. A linear roller bearing as defined in claim 1, wherein said roller bodies are formed so that one of said roller bodies from each row of revolving roller bodies always enters said load-bearing conduit at a same time.

12. A linear roller bearing as defined in claim 1; and further comprising a roller body chain which keeps said roller bodies in at least two of said revolving rows of said roller bodies apart from one another.

13. A linear roller bearing as defined in claim 1; and further comprising a plurality of spacer pieces which keeps said roller bodies in at least two of said revolving rows of said roller bodies apart from one another.

* * * * *